(12) United States Patent
Tsukatani

(10) Patent No.: US 7,435,017 B2
(45) Date of Patent: Oct. 14, 2008

(54) DIGITAL SINGLE LENS REFLEX CAMERA

(75) Inventor: Eiri Tsukatani, Shinagawa-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 11/305,408

(22) Filed: Dec. 15, 2005

(65) Prior Publication Data

US 2006/0177213 A1 Aug. 10, 2006

(30) Foreign Application Priority Data

Feb. 4, 2005 (JP) ............................. 2005-028930

(51) Int. Cl.
*G03B 19/12* (2006.01)
*G03B 17/02* (2006.01)
*G03B 15/03* (2006.01)
*H04N 5/222* (2006.01)

(52) U.S. Cl. ..................... 396/358; 396/177; 396/357; 396/539; 348/371

(58) Field of Classification Search ................. 396/358, 396/132, 354, 356, 535, 539, 176–178, 357; 348/371–374, 376
See application file for complete search history.

(56) References Cited

U.S. PATENT DOCUMENTS

| 4,864,336 A | * | 9/1989 | Fukahori et al. ............ 396/406 |
| 5,708,896 A | | 1/1998 | Machida |

FOREIGN PATENT DOCUMENTS

| JP | 2-39236 A | 3/1990 |
| JP | 9-80603 A | 3/1997 |

* cited by examiner

*Primary Examiner*—Rochelle-Ann Blackman
(74) *Attorney, Agent, or Firm*—Canon U.S.A., Inc., IP Division

(57) ABSTRACT

At least one exemplary embodiment is directed to a digital single lens reflex camera which includes a motor on a side of a mirror box above a battery storage unit for a detachable battery, such that the motor's output shaft can be substantially perpendicular to the optical axis, which facilitates reduction of the size of the entire camera.

6 Claims, 8 Drawing Sheets

DIGITAL SINGLE LENS REFLEX CAMERA

BACKGROUND OF THE INVENTION

1. Field of the Invention

The present invention relates to a single lens reflex camera. Particularly, though not exclusively, the invention relates to positioning a motor for driving a quick return mirror.

2. Description of the Related Art

Various proposals are made about how to dispose in the single lens reflex camera the constituent elements such as motors and capacitors in order to reduce its size.

For example, Japanese Utility Model Application Laid-Open No. 2-39236 discusses a single lens reflex camera where the motor is disposed in a spool room on a side of a mirror box such that its output shaft intersects with an optical axis.

Japanese Patent Application Laid-Open No. 9-80603 discusses a configuration that separately lays out the same kinds of constituent elements. That is, one of the cylindrical capacitors for driving a built-in flash unit is disposed inside a camera grip together with a battery, and other cylindrical capacitors are disposed inside the camera body other than the camera grip.

When reducing the size of the single lens reflex camera, the layout options for the constituent elements are limited due to the arrangement constrictions of a quick return mirror that guides the optical flux to the finder optical system and a mirror box that surrounds it. Particularly, in the silver halide film single lens reflex camera, the spaces for a spool and a film cartridge room for storing the film should be located in predetermined positions with respect to the optical axis, therefore, other constituent elements inevitably are laid out in the specified positions.

In recent years, the single lens reflex camera has been digitalized, with the film replaced by an image capture element for capturing an object image. However, the layout of elements constituting the digital camera inherits practices of the silver halide film single lens reflex camera, which are not suitable for the digital single lens reflex camera.

The camera discussed in Japanese Utility model Application Laid-Open No. 2-39236 is an example of the silver halide film single lens reflex camera, in which the film storing section restrains the motor layout.

SUMMARY OF THE INVENTION

At least one exemplary embodiment is directed to a small digital single lens reflex camera that optimizes positioning of a motor that can supply necessary driving power all by itself.

At least one exemplary embodiment is directed to a digital single lens reflex camera that includes a mirror box having a quick return mirror in the inside; a battery storage unit disposed on a side of the mirror box; and a motor configured to drive at least the quick return mirror, where the motor is disposed in a direction such that its output shaft is substantially perpendicular to an optical axis, at an upper part of the battery storage unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention.

DETAILED DESCRIPTION OF THE EMBODIMENTS

Figure 1:
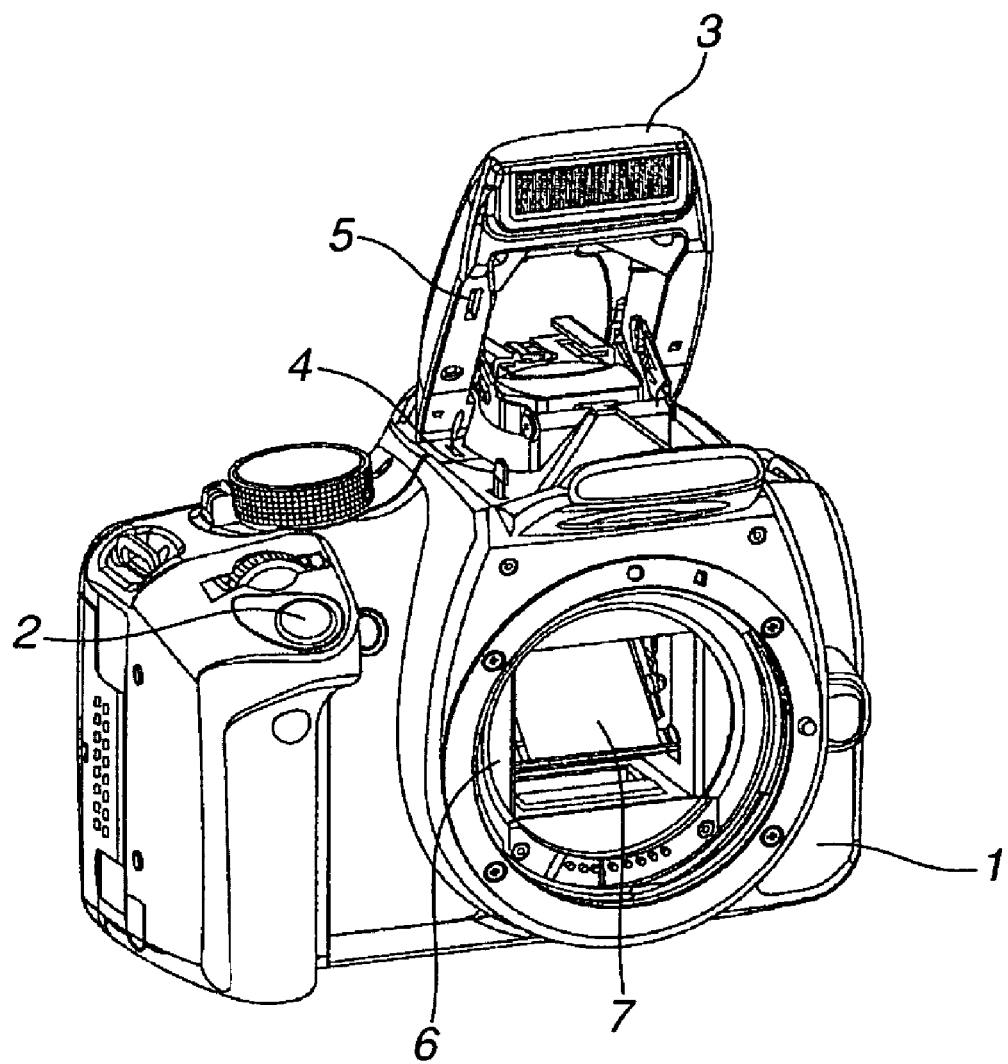
FIG. 1 is a perspective view of a digital single lens reflex camera according to at least one exemplary embodiment.

The following description of exemplary embodiment(s) is merely illustrative in nature and is in no way intended to limit the invention, its application, or uses.

Exemplary embodiments can be incorporated into various imaging devices (e.g., electronic cameras, camcorders, digital still cameras, film cameras, broadcast cameras, other imaging devices as known by one of ordinary skill, and equivalents).

Processes, techniques, apparatus, and materials as known by one of ordinary skill in the art may not be discussed in detail but are intended to be part of the enabling description where appropriate. For example, lens and lens units are discussed and any material that can be used to form lenses should fall within the scope of exemplary embodiments (e.g., glass, Si). Additionally the actual size of the lens may not be discussed however any size from macro lenses to nano lenses are intended to lie within the scope of exemplary embodiments (e.g., lenses with diameters of nanometer size, micro size, centimeter size, and meter sizes).

Additionally exemplary embodiments are not limited to visual imaging devices (e.g., optical photographic systems), for example the system can be designed for use with infrared and other wavelength imaging systems or any apparatus of device using flexible printed boards. Additionally, exemplary embodiments can be used with non-digital systems as well as digital systems (e.g., photographic systems using CCDs).

Notice that similar reference numerals and letters refer to similar items in the following figures, and thus once an item is defined in one figure, it may not be discussed or further defined in the following figures.

Exemplary embodiments of the present invention will be described in detail in accordance with the accompanying drawings.

FIG. 1 is a perspective view of a digital single lens reflex camera according to one exemplary embodiment. Referring to FIG. 1, reference numeral 1 denotes a camera body. Reference numeral 2 denotes a shutter release button for instructing image capture. Reference numeral 3 denotes a built-in flash unit. The perspective view shows the built-in flash unit 3 moved to the light emitting position. A flash unit up spring (not shown) is applying a force to the built-in flash unit 3 in a direction to the light emitting position. The built-in flash unit 3 is held closed, when at a stored position, by a flash unit fastening hook 4 that latches a flash unit fastening member 5. The operation will be described later in detail.

A mirror box 6 encloses a space in the optical axis direction where a quick return mirror 7 is driven. The quick return mirror 7 reflects and guides the optical flux to the finder optical system. Normally, its surface is processed by shading paper to prevent internal reflection of the optical flux.

Figure 2:
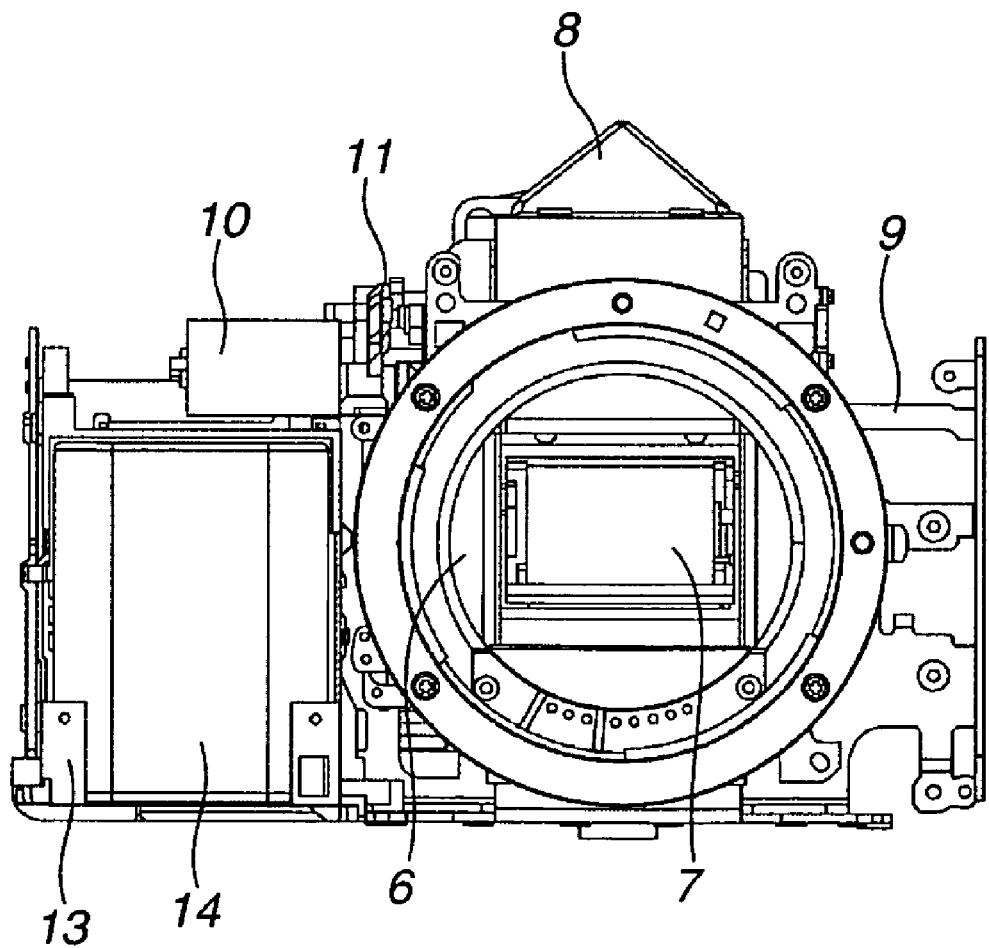
FIG. 2 is a front view of an inner mechanism with an external component of the camera in FIG. 1 removed.
Figure 3:
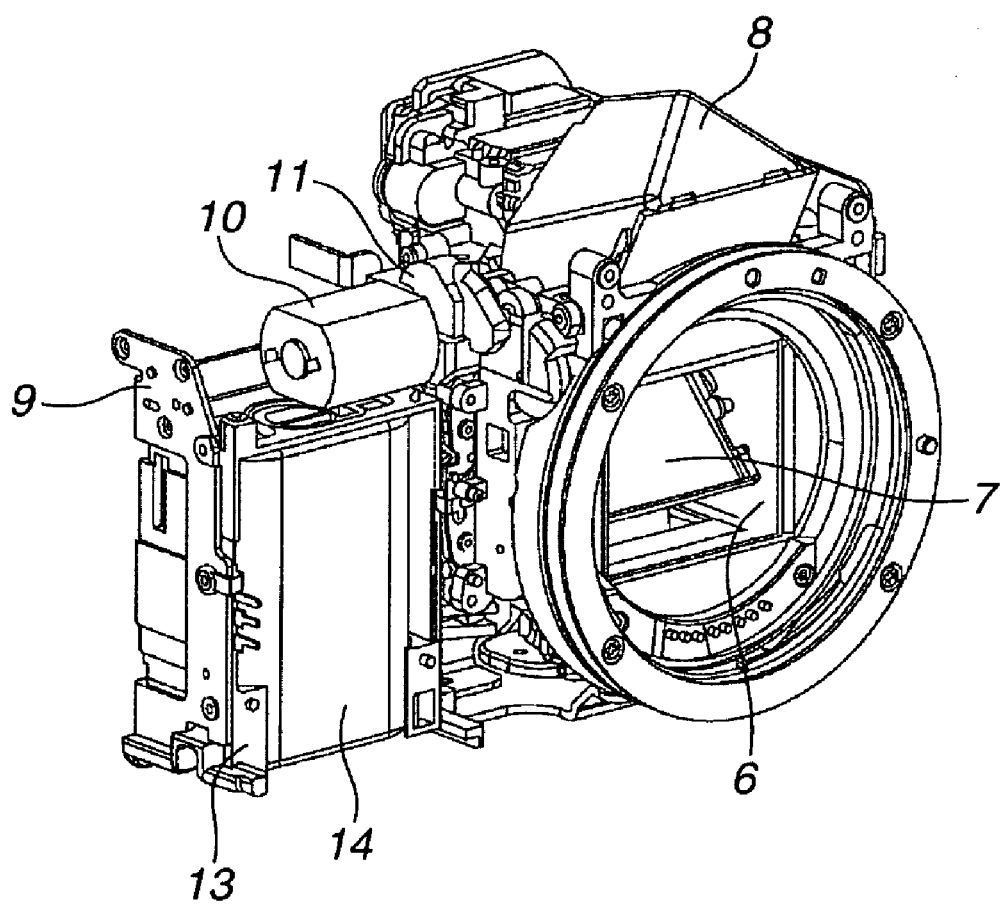
FIG. 3 is a perspective view of the inner mechanism with the external component of the camera in FIG. 1 removed.
Figure 4:
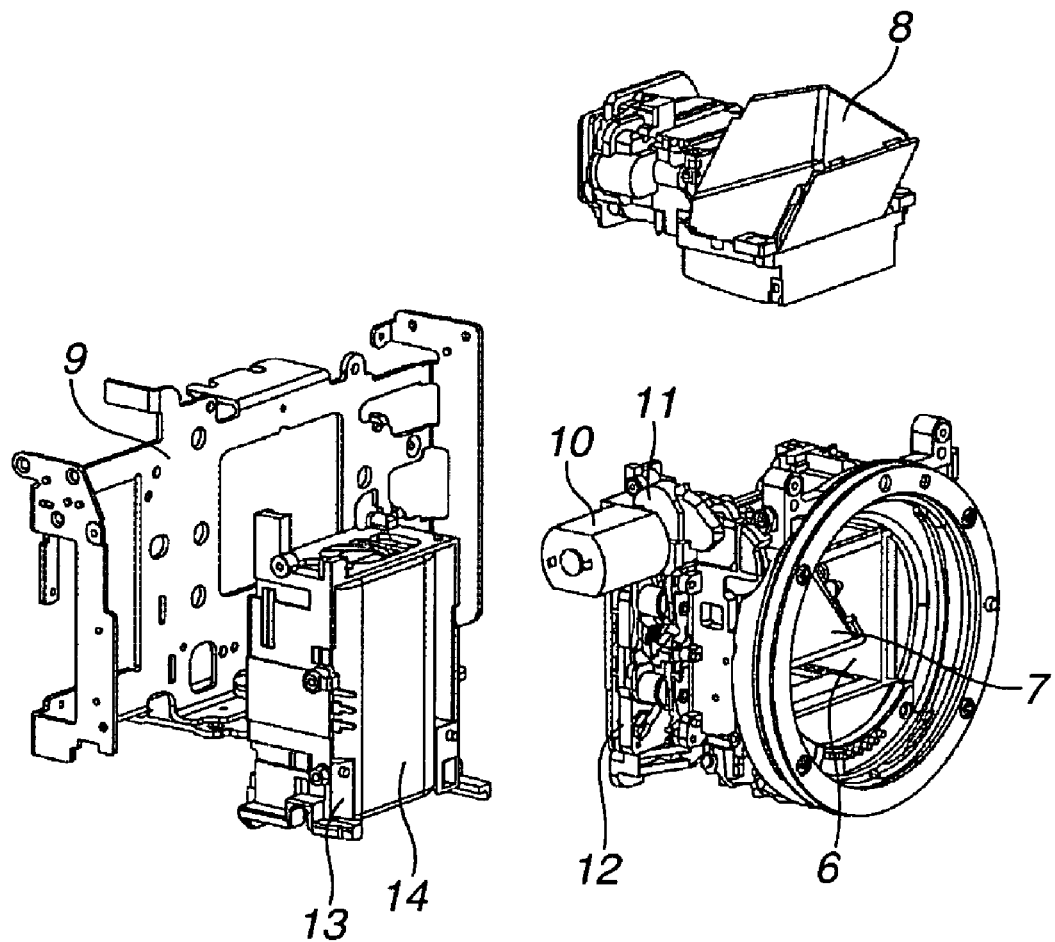
FIG. 4 is an exploded perspective view of main units of the inner mechanism with the external component of the camera in FIG. 1 removed.

FIG. 2 is a front view of an inner mechanism of the digital single lens reflex camera with external components removed. FIG. 3 is a perspective view of an inner mechanism. FIG. 4 is an exploded perspective view of main units of the inner mechanism. The same reference numerals are used for the elements identical to FIG. 1.

Figure 5:
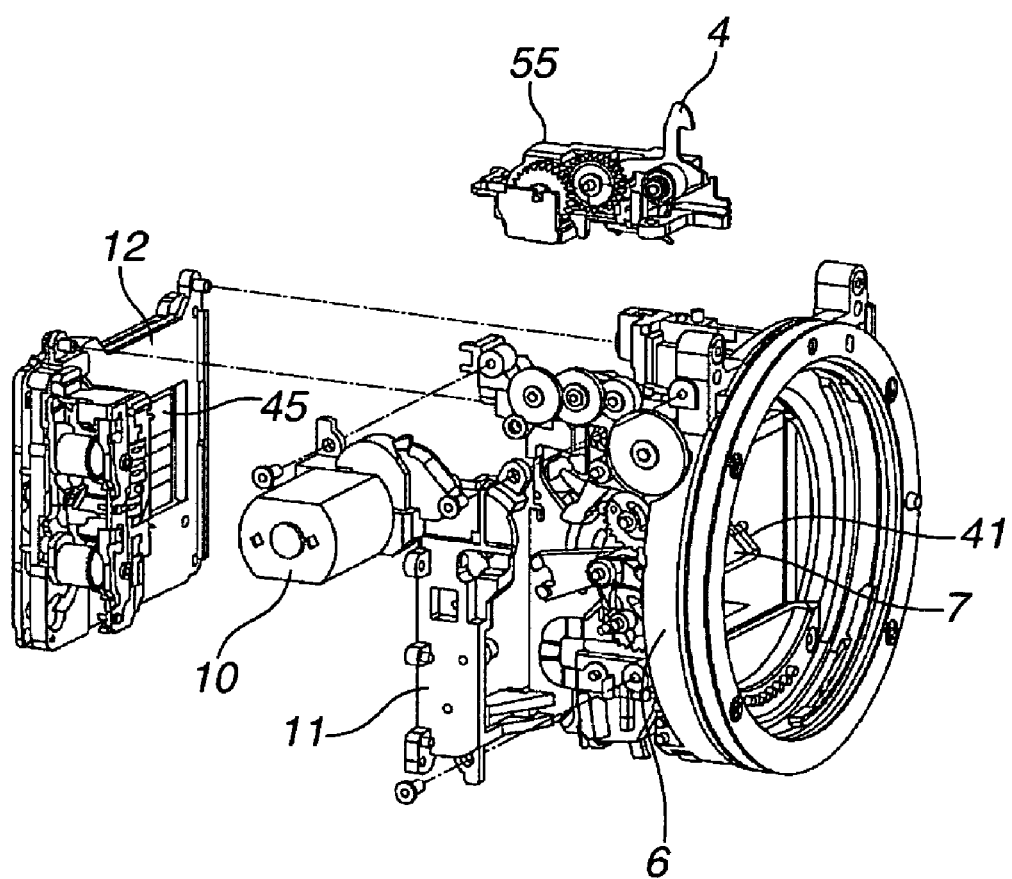
FIG. 5 is an exploded view showing the structure surrounding a mirror box in detail.

Referring to FIGS. 2, 3, and 4, reference numeral 8 denotes a penta mirror generally formed by bonding a prism and mirror together, that reflects the optical flux reflected by the quick return mirror further to an eyepiece. Reference numeral 9 denotes a main base plate, to fix and support exterior components or structures such as the mirror box 6, which can be formed by press molding and other manufacturing methods as known by one of ordinary skill in the relevant arts. Reference numeral 10 denotes a motor for driving a quick return mirror 7, popping up the built-in flash unit 3, and charging shutter blades (to be described later) of a shutter unit 12 (FIG. 5). The motor's (10) output shaft is connected to the gear trains which will be described later. The motor 10 can be fixed to the side of the mirror box 6 via a motor bottom board 11. Reference numeral 13 denotes a battery storage unit. Reference numeral 14 denotes a battery detachable from the camera body. FIGS. 2, 3 and 4 show a battery 14 fitted to the battery storage unit 13. The battery storage unit 13 can be fixed to the main base plate 9.

As illustrated in the Figures, the motor 10 can be disposed above the battery storage unit 13 such that the motor's output shaft intersects at right angles with the mirror box 6, that is, substantially perpendicular to the optical axis. The shape of the motor 10 can vary, for example approximately oval, following the shape of the upper face of the battery storage unit 13. Such a motor employed in the exemplary embodiment can narrow the space between the output shaft of the motor 10 and the upper face of the battery storage unit 13.

FIG. 5 is an exploded perspective view showing the structure surrounding the mirror box 6 in detail.

A mirror receiving plate 41 is a component for holding the quick return mirror 7, which can be driven together with the quick return mirror 7.

A force can be applied to the shutter blades 45 in the shutter unit 12 by a spring (not shown) in a scanning direction at the time of exposure. The shutter blades are opened and shut by the spring releasing operation and charging operation, which will be described later.

FIG. 5 shows a flash gear unit 55 including the flash unit fastening hook 4 (not shown in FIGS. 2, 3, and 4). The flash gear unit 55 as described later transmits the driving power of the motor 10, and releases the flash unit fastening hook 4 that holds the built-in flash unit 3 in the stored position. The built-in flash unit 3 can be urged by a spring (not shown) to accordingly pop up in a pop-up direction.

Figure 6:
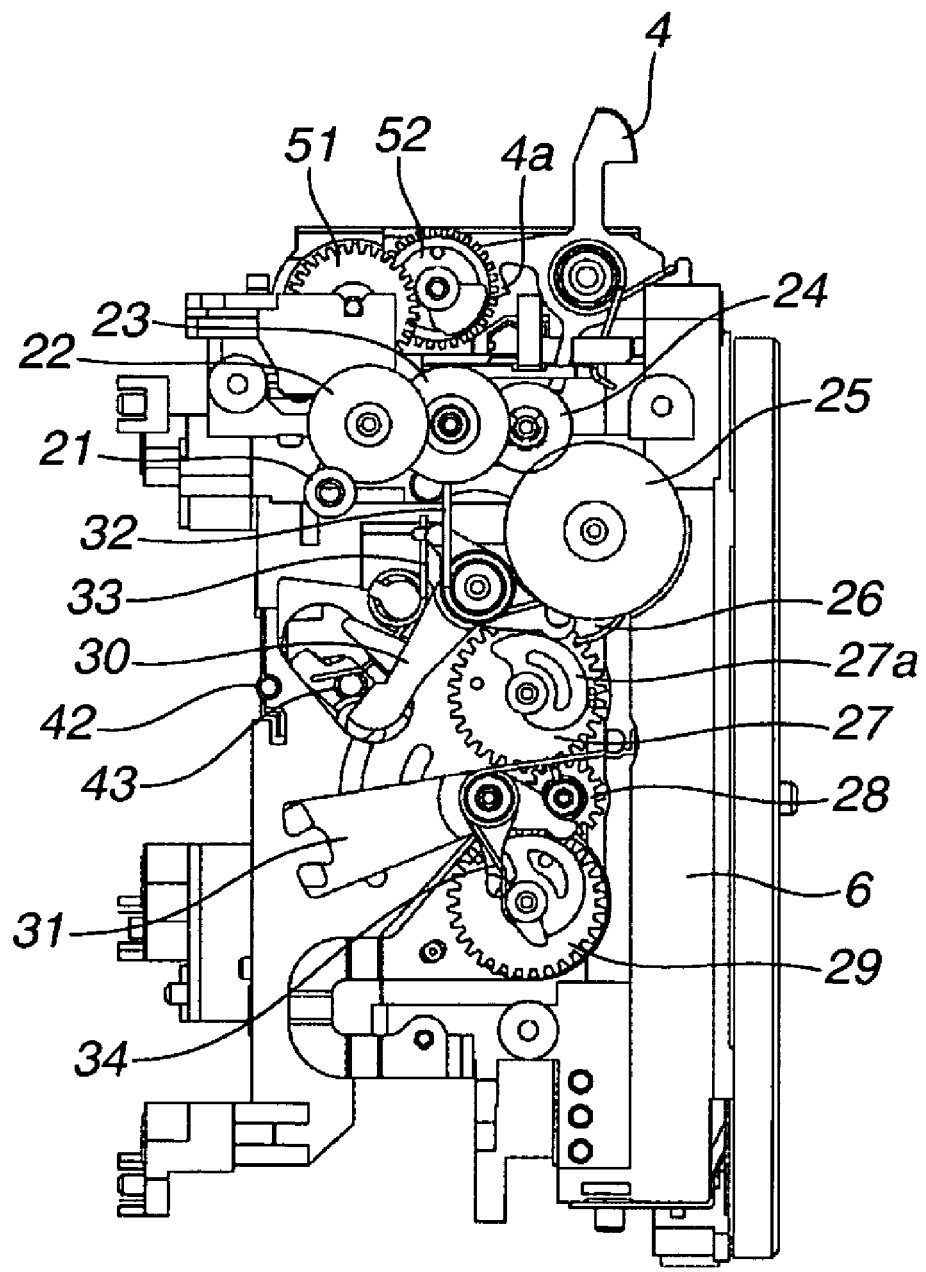
FIG. 6 is a side view of the mirror box of the camera in FIG. 1 showing a standby state.
Figure 7:
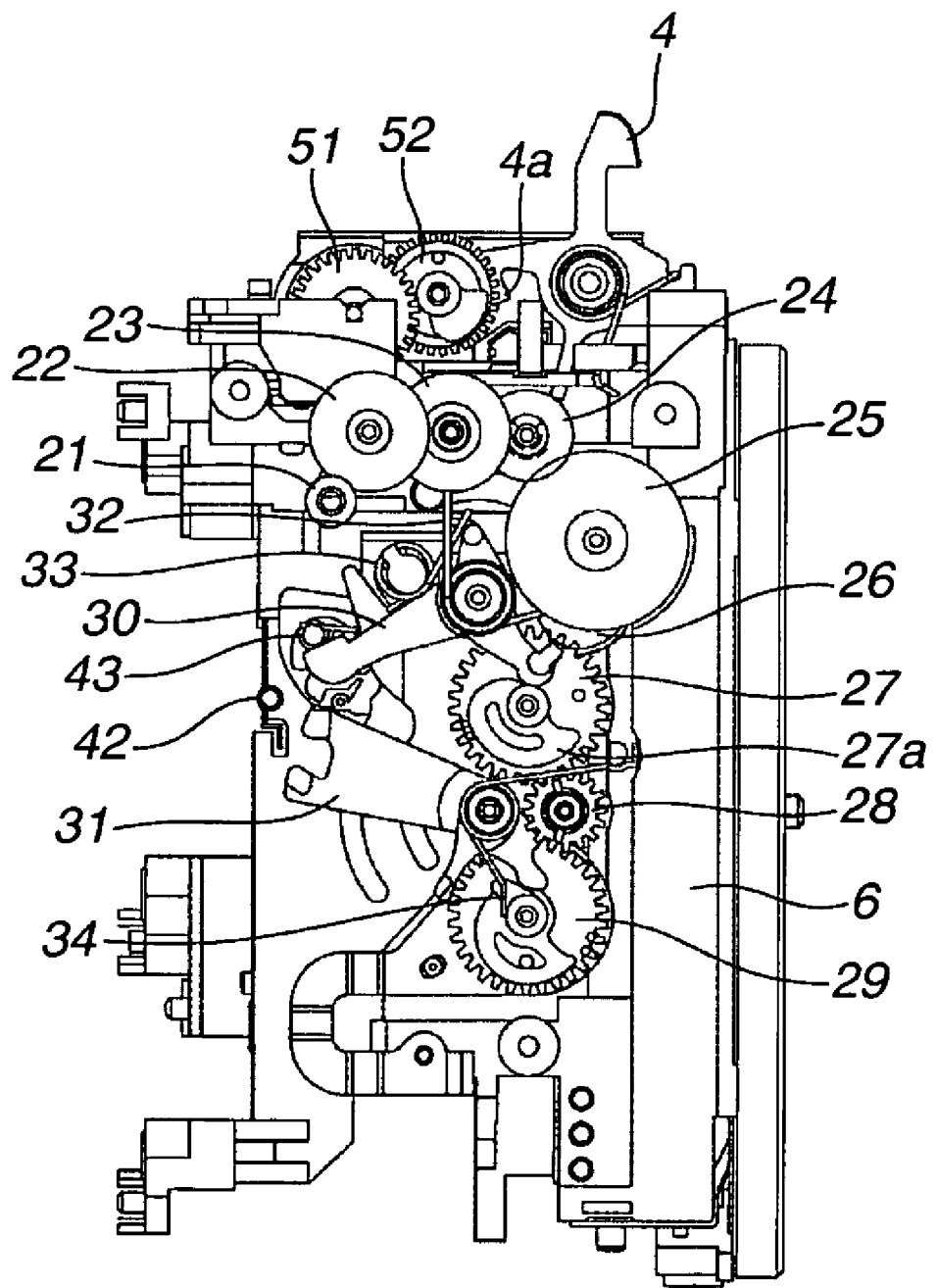
FIG. 7 is a side view of the mirror box of the camera in FIG. 1 showing a mirror up state.
Figure 8:
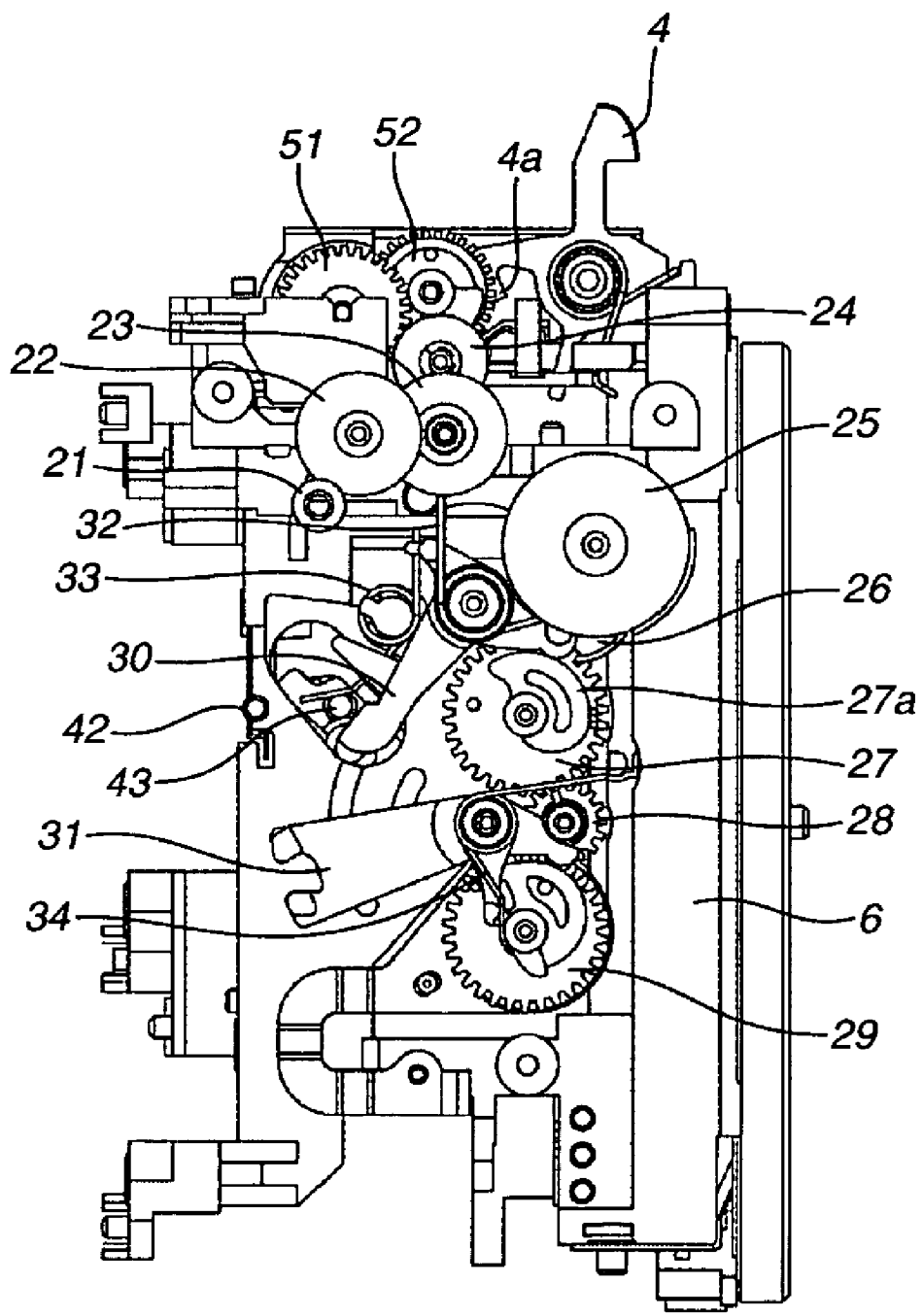
FIG. 8 is a side view of the mirror box of the camera in FIG. 1 showing a flash unit up state.

FIGS. 6, 7 and 8 describe the operations of gears disposed at a side face of the mirror box 6.

Reference numeral 21 denotes a pinion gear attached to the output shaft of the motor 10. Reference numeral 22 denotes a motor deceleration gear that transmits the driving power of the motor 10 to a sun gear 23. Reference numeral 24 denotes a planetary gear revolving around the sun gear 23 within a predetermined angle.

Reference numeral 25 denotes a mirror deceleration gear. Reference numeral 26 denotes a mirror transmission gear. Reference numeral 27 denotes a mirror cam gear. These gears (25, 26, and 27) can drive a mirror drive lever 30 to carry out up and down movements of the quick return mirror 7. Further, a mirror up spring 32 and mirror down spring 33 apply forces in respective directions depending on the driving status.

Reference numeral 28 denotes a shutter transmission gear. Reference numeral 29 denotes a shutter cam gear. The shutter blades 45 (FIG. 5) can be opened and shut by the driving force of the motor 10 via at least some of these gears, and also by a shutter drive lever 31 and a shutter drive lever spring 34.

The gears and levers other than the pinion gear 21, and excluding the planetary gear 24, are rotatably supported respectively by axes formed integrally with the mirror box, and can be sandwiched by the motor bottom board 11 that is fastened to the mirror box 6.

A series of operations of the camera 1 are described next using illustrations in FIGS. 6, 7 and 8. FIG. 6 shows a standby state, FIG. 7 a mirror up state and FIG. 8 a flash unit up state.

The standby state of FIG. 6 is the state in which the mirror is down and the shutter charge has been completed. The mirror drive lever 30 abuts to a cam top phase of a cam 27a of the mirror cam gear 27 while the mirror up spring 32 applies a force to the mirror drive lever 30 in the mirror up direction, that is, in the clockwise direction in the drawing. In that manner, the mirror down state is maintained.

The quick return mirror 7 is fixed to the mirror receiving plate 41. The mirror receiving plate 41 is rotatably supported to the mirror box 6 centering a rotation axis 42 of a mirror receiving plate 41 (FIG. 5). The mirror receiving plate drive axis 43 of the mirror receiving plate 41 is held between the mirror drive lever 30 and a mirror down spring 33. Accordingly, the quick return mirror 7 is driven up and down by the mirror drive lever 30.

When a photographer presses the shutter release button 2 to capture an object image, the motor 10 is energized and rotates in a reversed direction. That is, in FIG. 6, the pinion gear 21 rotates in a clockwise direction. The driving force is transmitted to the motor deceleration gear 22, the sun gear 23, the planetary gear 24, the mirror deceleration gear 25, the mirror transmission gear 26, and the mirror cam gear 27 in this order. The mirror cam gear 27 rotates in the clockwise direction. Further, the driving force is transmitted to a shutter transmission gear 28 and shutter cam gear 29. The shutter cam gear 29 also rotates in the clockwise direction.

The abutting position of the cam 27a of the mirror cam gear 27 and mirror drive lever 30 moves from a cam top to a cam bottom when the mirror cam gear 27 rotates in the clockwise direction. Because a force is applied to the mirror drive lever 30 by the mirror up spring 32, the mirror drive lever 30 rotates in the clockwise direction. As a result, the drive axis 43 of the mirror receiving plate 41 held between the mirror drive lever 30 and the mirror down spring 33 moves upward, and the quick return mirror 7 is in an up state. When the mirror up state ends, the energization of the motor 10 is discontinued to stop the motor 10.

The shutter drive lever 31 similarly rotates in the clockwise direction by the clockwise rotation of the shutter cam 29 to drive the shutter unit 12, and facilitates exposure scanning using the shutter blades 45.

The mirror up state in FIG. 7 is a state in which the shutter blades 45 are waiting for the exposure scanning. The motor 10 is energized to rotate in the reversed direction after the exposure scanning of the shutter blades 45, and, as a result, the mirror cam gear 27 and shutter cam gear 29 rotate in the clockwise direction similar to the above.

The abutting position of the cam 27a of mirror cam gear 27 and the mirror drive lever 30 moves from a cam bottom to a cam top when the mirror cam gear 27 rotates in the clockwise direction. The mirror drive lever 30 resists the urging force of the mirror up spring 32, and rotates in the anti-clockwise direction. As a result, the mirror receiving plate drive axis 43 held between the mirror drive lever 30 and mirror down spring 33 moves downward, and the quick return mirror 7 is in a down state.

The shutter drive lever 31 similarly rotates in the anti-clockwise direction by the rotation of the shutter cam 29 in the clockwise direction to drive the shutter unit 12, and to bring about a standby state, resisting the spring force of the shutter blade 45. Current transmission to the motor 10 is discontinued when the shutter unit 12 shifts to the standby state, and the motor 10 is stopped. That is, it returns to the state of FIG. 6.

FIG. 8 show a state in which the flash unit is up. The electrical current is transmitted to the motor 10 which rotates in the forward direction when, in the standby state shown in FIG. 6, the shutter release button 2 is pressed, and the CPU (not shown) decides that the light emission of the built-in flash unit 3 is necessary in accordance with the object image conditions, or when the built-in flash unit up button (not shown) is pressed by the photographer. That is, the pinion gear 21 rotates in the anti-clockwise direction in the drawing, and the driving power is transmitted to the motor deceleration gear 22 and the sun gear 23. The sun gear 23 rotates in the anti-clockwise direction. As a result, the planetary gear 24 comes off from the engagement with the mirror deceleration gear 25, revolves in the anti-clockwise direction to be engaged with the flash unit deceleration gear 51, and a driving power is transmitted. The flash unit deceleration gear 51 transmits a driving power to the flash unit cam gear 52, and the flash unit cam gear 52 rotates in the clockwise direction.

When flash unit cam gear 52 rotates in the clockwise direction, the cam (not shown) abuts to and presses down a fastening hook cam abutting member 4a of the flash unit fastening hook 4, then the flash unit fastening hook 4 rotates in the anti-clockwise direction. Due to this operation, the flash unit fastening hook 4 latched to the flash unit fastening member 5 is released. The built-in flash unit 3 is pushed up to the light emitting position by the spring (not shown) that urges force in the upward direction.

As described above, according to at least one exemplary embodiment, the battery storage unit 13 can be disposed in the space occupied by the spool of the silver halide film single lens reflex camera. The motor 10 is disposed above this space so that its optical shaft intersects with the optical axis, in this way, the space is effectively utilized for the layout of the constituent elements of the camera. According to at least one exemplary embodiment, one motor effectively enables the driving operation of quick return mirror 7, the opening and shutting operations of shutter blades 45, and the pop up operation of built-in flash unit 3.

In at least one exemplary embodiment, the battery storing unit 13 and motor 10 are disposed at the left-hand side when the camera is viewed from the object image side. Alternatively, both elements can be disposed at the right-hand side. Thus, the space that has been occupied by the film cartridge in the silver halide film single lens reflex camera can be effectively utilized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-028930 filed Feb. 4, 2005, which is hereby incorporated by reference herein in its entirety.

What is claimed is:

1. A digital single lens reflex camera, comprising:
   a mirror box including a quick return mirror;
   a battery storage unit disposed on a side of the mirror box; and
   a motor including an output shaft, configured to drive the quick return mirror, wherein the motor is disposed in a direction such that its output shaft is substantially perpendicular to an optical axis and is parallel to a drive axis of the quick return mirror, at an upper part of the battery storage unit.

2. The digital single lens reflex camera according to claim 1, further comprising: shutter blades, wherein the motor charges and drives the shutter blades.

3. The digital single lens reflex camera according to claim 1, wherein the motor shifts a built-in flash unit from its stored position to a light emitting position.

4. The digital single lens reflex camera according to claim 1, wherein the motor includes a non-circular cross section and is disposed such that the cross section is minimized in a direction corresponding to a vertical direction of the battery storage unit.

5. A digital single lens reflex camera, comprising:
   a mirror box including a quick return mirror;
   a battery storage unit disposed on a side of the mirror box; and
   a motor including an output shaft, wherein the motor is disposed in a direction such that its output shaft is substantially perpendicular to an optical axis, at an upper part of the battery storage unit, wherein the motor charges and drives a set of shutter blades by rotating in a first rotating direction, and wherein the motor shifts a built-in flash unit from its stored position to an light emitting position by rotating in a second rotating direction which is reverse to the first rotating direction.

6. A digital single lens reflex camera, comprising:
   a mirror box including a quick return mirror;
   a battery storage unit disposed on a side of the mirror box; and
   a motor including an output shaft, configured to drive the quick return mirror, wherein the motor is disposed in a direction such that its output shaft is substantially perpendicular to an optical axis, at an upper part of the battery storage unit;
   wherein the motor includes a non-circular cross section and is disposed such that the cross section is minimized in a direction corresponding to a vertical direction of the battery storage unit.

* * * * *